UNITED STATES PATENT OFFICE.

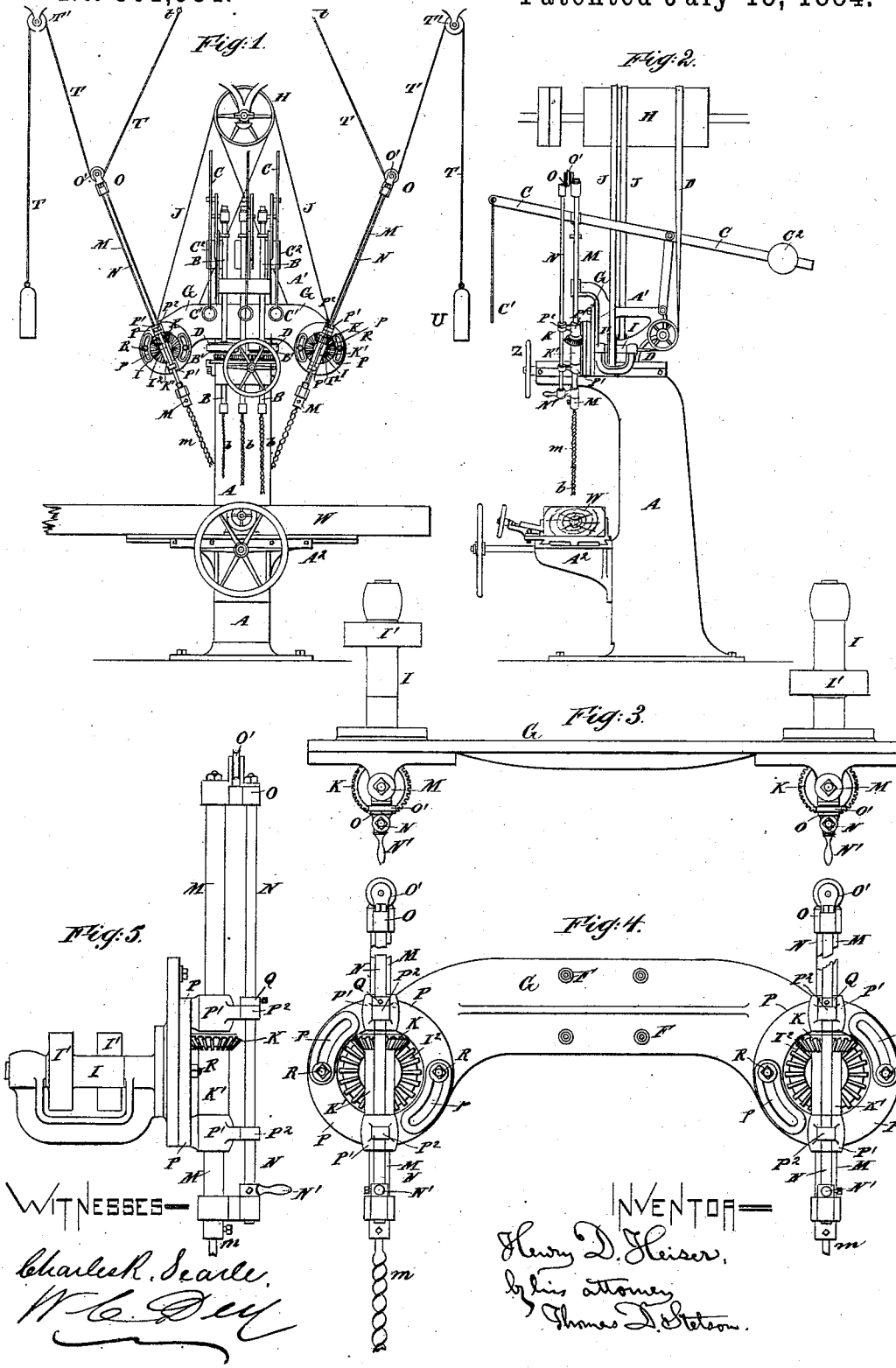

HENRY D. HEISER, OF WATSONTOWN, PENNSYLVANIA.

WOOD-BORING MACHINE.

SPECIFICATION forming part of Letters Patent No. 301,984, dated July 15, 1884.

Application filed July 27, 1883. (No model.)

*To all whom it may concern:*

Be it known that I, HENRY D. HEISER, of Watsontown, in the county of Northumberland and State of Pennsylvania, mechanical engineer, have invented certain new and useful Improvements in Wood-Boring Machines; and I do hereby declare that the following is a full and exact description thereof.

My invention allows the boring of holes obliquely, either alone or simultaneously with the boring of holes vertically. It is intended more especially for boring the holes for the tie-bolts in the side framing of freight-cars for use on railroads; but it may be used for a great variety of work. I can change the obliquity of the boring. I can bore vertical holes with the same bit or auger with which I bore the oblique holes.

The improvement may be applied in a new machine especially constructed for it, or it may be applied to old machines having ordinary provisions for boring one or more vertical holes.

I will describe the improvement as applied to an old machine.

The accompanying drawings form a part of this specification, and represent what I consider the best means of carrying out the invention.

Figure 1 is a front elevation, showing a complete boring-machine with the improvement in position for use. Fig. 2 is a corresponding side elevation. The remaining figures are on a larger scale, and show the novel parts detached. Fig. 3 is a plan. Fig. 4 is a front elevation, and Fig. 5 is a side elevation.

Similar letters of reference indicate corresponding parts in all the figures where they occur.

A is a fixed frame-work, of cast-iron or other suitable material, certain parts being designated, when necessary, by additional marks, as $A'$ $A^2$.

I employ any ordinary or suitable provisions, $A'$, for supporting vertical spindles B, (represented as three in number,) each carrying a suitable boring-bit, $b$, and equipped with a handle, $C'$, and lever C, and a balance-weight, $C^2$, for moving them endwise, and with pulleys $B'$, which receive a belt, D, operated by suitable connections from a steam-engine or other suitable power to impart to each vertical spindle B the required strong and rapid rotary motion.

I employ a work-table, $A^2$, which may be equipped with anti-friction rollers, and with any other ordinary or suitable devices to facilitate the easy movement of the lumber to be bored, and the correct determination of the position in which it is to be held to receive the boring-bit or auger.

So far as yet described, the machine may be of an ordinary and long-approved character.

G is a rigid plate, of cast-iron or other suitable material, firmly secured by bolts F or by other suitable means upon the framing $A'$, so as to extend out from the framing in opposite directions. A shaft, I, at each end, driven by the aid of pulleys $I'$, carries beveled gear-wheels $I^2$, engaged, respectively, with gear-wheels K, which are mounted on sleeves $K'$, which latter are engaged by feathers (not represented) with boring-spindles M M, supported, respectively, in bosses $P'$, which are fixed on stout adjustable rings P, each concentric to its respective shaft I. Each ring P may be turned partially around on an axis coincident with the shaft I, and may be fixed in the desired inclination by means of bolts and nuts R, which are set in curved slots $p$, as indicated. Power is communicated to each of the pulleys $I'$ by belts J from a single pulley, H, which is driven by suitable connections from a steam-engine or other power. The effect is to rotate the spindles M strongly and rapidly. An exchangeable boring-bit or auger, $m$, is set in the lower end of each spindle M. An arm, $P^2$, extends out beyond each boss $P'$, and affords a bearing for a sliding rod, N, which lies each parallel to its respective spindle M, and is connected thereto by a yoke, O, at the top, and by another yoke at the bottom. This rod has a handle, $N'$, by which the operator may conveniently grasp it and exert his strength to move the rod N, and consequently the connected spindle M, endwise, upward, or downward, either vertically or in any oblique position in which these parts may be held by the adjustment of its respective ring P. The upper yoke, O, carries a grooved pulley or sheave, $O'$, which receives a cord, T, one end of which cord is fastened to a knob or other convenient fixture, $t$, on the ceiling, or on any suitable framing. (Not represented.) The other end of the cord carries a weight, U, and the cord being passed over a pulley, T', the force of the weight is exerted to advantage to resist the gravity of the spindle M and its connections. Each weight U serves as a balance-weight for its respective spindle. Each cord T, by reason of the pulley T', being at a considerable distance from the knob or fastening t, allows the inclination of the spindle M to be changed within wide limits without seriously interfering with the balancing effect of the weight and cord. A hand-wheel, Z, operating a connected screw, (not represented,) adjusts the framing A' and its attachments forward and backward, at will.

Operation: When it is desired to use the boring-bits m, the plate G, with its attached rings P, shafts I, and spindles M, and their several connections, which may have been previously stored in any convenient part of the shop, may be secured by the bolts F to the frame A'. Then the belts J being applied and properly adjusted, my invention is ready to serve either alone or in combination with the main boring-spindles B.

W is a piece of suitable lumber supported on the table A², and held in position to be submitted to the action of the boring-bits. If the rings P and their connected parts have not been previously adjusted in the required oblique positions, this should now be done and the nuts R set up firmly. Then, the lumber W being shifted endwise to the right position on the table A², and the part A', carrying my plate G, being properly adjusted forward and backward, the operator grasps the handle N' and moves it and its connections gradually downward. The spindle M, driven by the shaft I, operates the bit m and produces the required inclined hole. If there are also vertical holes to be bored in the same lumber, the operator grasps the corresponding handle, G', and, pulling downward thereon, causes the bits b to produce the required vertical holes. If only one set of inclined holes are required, only the spindle M and its connections on one end of the plate G will be used; but if, as is common in freight-cars, holes are required in two opposite directions, I use both boring-spindles M, setting one inclined in one direction and the other inclined in the other direction to the same or different degrees. The arrangement of the sheaves O', cords T, and their attached weights U allows the two spindles M to be depressed simultaneously, or as convenience may dictate. I graduate the edges of the rings P to aid in setting them at any required angle to facilitate the observing and recording of the angles at which the holes have been bored, so as to adjust the machine to produce the same again when required.

Q are stops, each fixed by pinching-screws in adjustable positions on the rods N. They serve to gage how low the respective spindles M, and consequently the inserted bit m, may be depressed. Being not on the spindles M, but on the rods N, which have no rotary motion, the stops Q are subject to no frictions.

Modifications may be made in the forms and proportions. Parts of the invention may be used without the whole. I can dispense with the sleeves K' and allow the beveled gear-wheels K to be supported each by its engaging gear-wheel I². I can use the invention with much success with only one of the spindles M and its several connected parts. In such case the center should be sufficiently far out from the frame to allow the spindle M to be inclined in either direction. I prefer the two sets of boring parts, each capable of independent adjustment in height and inclination, as shown. The plate G, rings P, and spindle M may be permanently attached to the frame A', if preferred.

I claim as my invention—

1. The frame A', having cross-plate G secured thereto and extending horizontally in opposite directions, combined with spindles B b, mounted in fixed bearings in the frame A', adjustable spindles M m, mounted in rings P upon either end of the plate G, the wheel Z and connections for adjusting the frame A' forward and backward, and means for adjusting the rings P in a circle, as herein specified.

2. In combination with the spindle M and yoke O, having sheave O', as shown, the cord T, carrying weight U at one end, and being secured to the fixture t at the other, and the pulley T', arranged distant from said fixture, whereby the said cord is operated in angular positions to allow the sheave O' to take various positions between the vertical planes of said pulley and fixture, and thus equalize the balancing force of the weight U in various positions of the spindle, as set forth.

In testimony whereof I have hereunto set my hand, at Watsontown, Pennsylvania, this 17th day of July, 1883, in the presence of two subscribing witnesses.

HENRY D. HEISER.

Witnesses:
 JOS. H. RHOADS,
 JAS. M. HUFF.